United States Patent [19]

Kawamura et al.

[11] Patent Number: 4,894,594

[45] Date of Patent: Jan. 16, 1990

[54] SERVO SYSTEM SPEED CONTROL APPARATUS

[75] Inventors: Hideaki Kawamura, Hachioji; Kentaro Fujibayashi, Mitaka; Nozomu Arimoto, Hino, all of Japan

[73] Assignee: Fanuc Ltd, Yamanashi, Japan

[21] Appl. No.: 255,192

[22] PCT Filed: Jan. 23, 1988

[86] PCT No.: PCT/JP88/00049

§ 371 Date: Sep. 21, 1988

§ 102(e) Date: Sep. 21, 1988

[87] PCT Pub. No.: WO88/05566

PCT Pub. Date: Jul. 28, 1988

[30] Foreign Application Priority Data

Jan. 24, 1987 [JP] Japan .................................. 62-013328

[51] Int. Cl.$^4$ ............................................. G05B 19/10
[52] U.S. Cl. ................................... 318/567; 318/571; 318/569
[58] Field of Search ................... 318/567, 571, 569

[56] References Cited

U.S. PATENT DOCUMENTS 3,941,987  3/1976  Tack, Jr. .......................... 318/571
4,757,457  7/1988  Matsumoto ........................ 364/474

Primary Examiner—William M. Shoop, Jr.
Assistant Examiner—Saul M. Bergmann
Attorney, Agent, or Firm—Armstrong, Nikaido, Marmelstein, Kubovcik & Murray

[57] ABSTRACT

The designated speeds of a plurality of blocks are read beforehand, deceleration start positions are calculated to maintain the servo system at a speed below the designated speeds of the blocks read beforehand at the start positions of the previously read blocks, and the servo system is decelerated from the calculated deceleration start positions, whereby the servo system speed is kept below the designated speeds of all of the blocks and the deceleration of the speed of the servo system is controlled with a high degree of accuracy.

5 Claims, 6 Drawing Sheets

| N 100 | G 05.1 |       |       |
|-------|--------|-------|-------|
| N 110 | G 00   | G 90  | X 0   |
| N 120 | G 01   | G 91  | F 1000|
| N 130 | X 50   |       |       |
| N 140 | X 50   |       |       |
| N 150 | X 50   |       |       |
| N 160 | X 50   |       |       |
| N 170 | G 01   | X 50  | F 100 |
| N 180 | X 50   | F 500 |       |
| N 190 | X 10   | F 100 |       |
| N 200 | X 100  | F 500 |       |
| N 210 | G 05.1 | P 1   |       |

Fig.1

| N 100 | G 05.1 |
|---|---|
| N 110 | G 00     G 90     X 0 |
| N 120 | G 01     G 91     F 1000 |
| N 130 | X 50 |
| N 140 | X 50 |
| N 150 | X 50 |
| N 160 | X 50 |
| N 170 | G 01     X 50     F 100 |
| N 180 | X 50     F 500 |
| N 190 | X 10     F 100 |
| N 200 | X 100    F 500 |
| N 210 | G 05.1   P 1 |

SERVO SYSTEM SPEED CONTROL APPARATUS

DESCRIPTION

1. Technical Field

The present invention relates to a servo system speed control apparatus, more particularly, to an apparatus for controlling a speed of a servo system by using a computer.

2. Background Art

Conventionally, a servo system speed control apparatus using a computer is used, for example, with a computerized numerical control apparatus (CNC apparatus), an industrial robot, and the like.

For example, when a workpiece is processed by a CNC apparatus, a suitable speed for processing the workpiece is designated to each block at which a specific process is to be carried out on the workpiece. For example, when an inner portion of the workpiece is to be cut at a right angle, a feed speed for cutting a corner portion of the workpiece is reduced in relation to a feed speed for a straight portion of the workpiece, so that an overload of the cutting tools is avoided and a cut surface of the workpiece is improved, and further, the corner portion of the workpiece is cut with a greater accuracy.

Note, in a conventional servo system speed control apparatus, first a speed designated to a block is read and then a speed of the servo system is changed to the designated speed. Therefore, in the conventional servo system speed control apparatus, a problem arises in that, if a block length for decelerating the speed is insufficient, the servo system speed cannot be lowered to the designated speed of the next block.

DISCLOSURE OF THE INVENTION

The object of the present invention is to perform a speed control of the servo system, more particularly, to suitably control a deceleration of the servo system.

According to the present invention, there is provided a servo system speed control apparatus for controlling the speed of a servo system by using a computer, characterized in that the speed control apparatus of the servo system comprises: a block speed pre-read means for previously reading a speed value designated to a plurality of blocks; a deceleration start position calculating means, at the start position of the previously read blocks, for calculating a deceleration start position to maintain the servo system at a speed lower than the designated speeds for the blocks; and a servo system deceleration means for lowering the speed of the servo system from the calculated deceleration start position.

According to the servo system speed control, apparatus having the above described configuration of the present invention, first a speed value designated for a plurality of blocks is previously read by the block speed pre-read means, and then the speed of the servo system is maintained at a speed lower than designated speeds of the blocks at the start position of the previously read blocks by the deceleration start position calculating means.

Furthermore, the speed of the servo system is lowered from the calculated deceleration start position by the servo system deceleration means. Consequently, the servo system speed control apparatus can maintain a servo system speed that is lower than the designated speeds of all blocks, and control a deceleration of the servo system with a high degree of accuracy.

BRIEF DESCRIPTION OF THE DRAWINGS

FIG. 1 is a diagram showing an example of the control command of the CNC apparatus;

BEST MODE FOR CARRYING OUT THE INVENTION

First, the problems of a conventional servo system speed control apparatus will be explained with reference to FIGS. 1 and 2, and then an embodiment of a servo system speed control apparatus according to the present invention will be explained.

Figure 2:
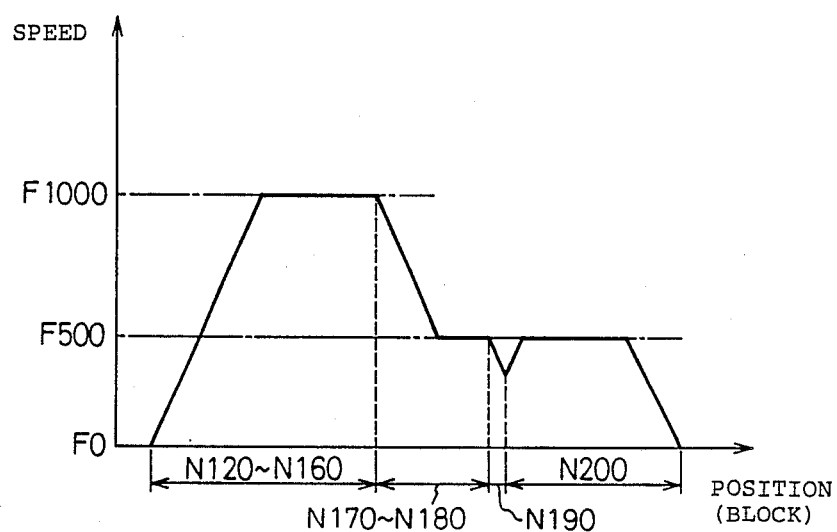
FIG. 2 is a diagram showing an example of a speed change of a servo system controlled by a conventional speed control apparatus of a servo system.

FIG. 1 is a diagram showing an example of the control command of the CNC apparatus, and FIG. 2 is a diagram showing an example of a speed change of a servo system controlled by a conventional servo system speed control apparatus.

As shown in FIGS. 1 and 2, when a speed of F 1000 between blocks N 120 and N 160 is changed to a speed of F 100 at a block N 170, in a conventional servo system speed control apparatus, a designated speed of the block can be recognized only after reading the contents of the block. Therefore, in the conventional servo system speed control apparatus, a servo system speed cannot be sufficiently decelerated to a speed of F 100 at a start position of the block N 170. Namely, the designated speed of the block N 170 is first recognized at the start position of the block N 170, and then the deceleration of the servo system begins from the start position of the block N 170.

Similarly, when a speed of F 500 in block N 180 is changed to a speed of F 100 at a block N 190, and further changed to a speed of F 500 at a block N 200, in the conventional servo system speed control apparatus, the servo system speed cannot be sufficiently decelerated at the start position of the block N 200, since the deceleration of the servo system starts from the start position of the block N 190, and the workpiece is reached before the servo system speed is decelerated to the designated speed of F 100 in the block N 190, so that a speed of the start position of the block N 200 is accelerated to the speed of F 500, which is the designated speed of block N 200.

As mentioned above, in the conventional servo system speed control apparatus, first a designated speed of a block is read and then a servo system speed is controlled to the designated speed. Therefore, in the conventional speed control apparatus of the servo system, a problem arises in that, if a single block length for deceleration is not sufficient, the servo system speed cannot be decelerated to the designated speed of the next block.

For example, when an inner portion of a workpiece is to be cut as a right angle, the feed speed designated for a corner portion cutting block (for example, a speed of F 100) is set to a speed slower than the feed speed designated for a straight portion cutting block (for example, a speed of F 1000). But, when a single block length for cutting a corner portion is not sufficient, it is difficult to decelerate the servo system speed of F 1000 to the speed of F 100, which is a suitable speed for cutting the corner portion.

Consequently, a CNC apparatus using the conventional servo system speed control apparatus (for example, a lathe), cannot decelerate the servo system to a suitable speed for cutting a corner portion, so that an overload is applied to a cutting tool and a life of the cutting tool is shortened.

Below an example of a servo system speed control apparatus according to the present invention will be explained with reference to the accompanying drawings.

Figure 3:
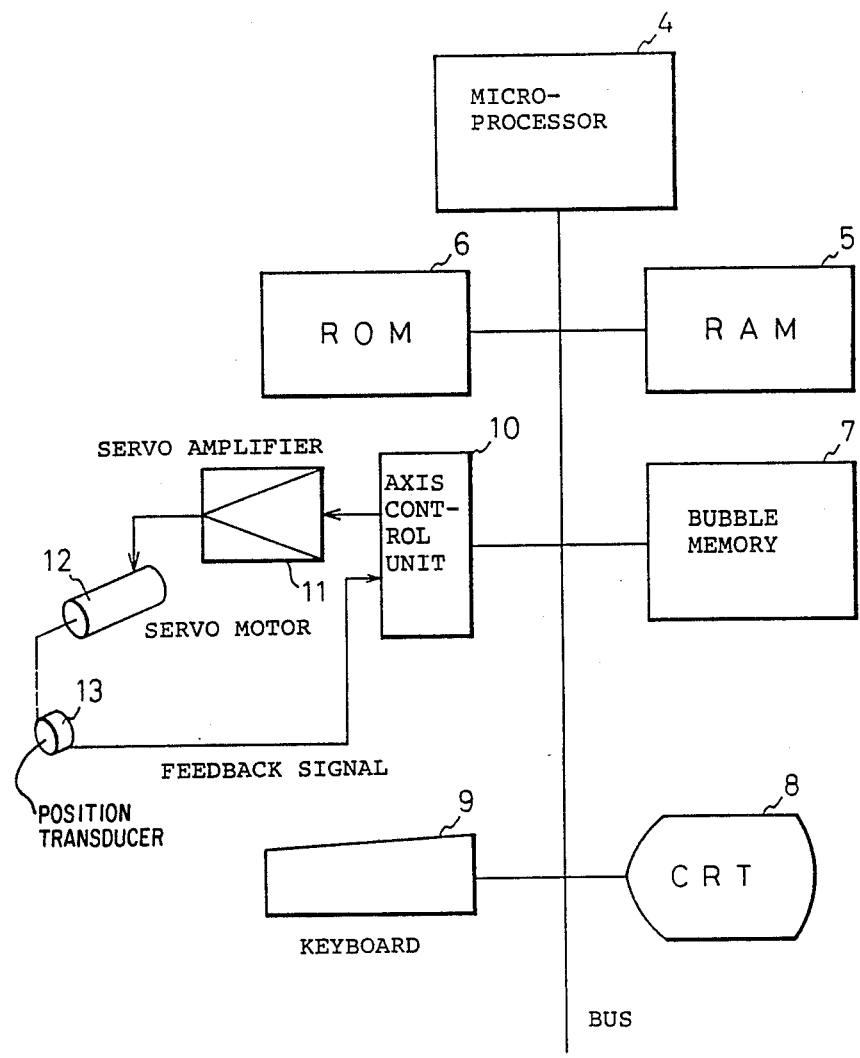
FIG. 3 is a schematic block diagram showing a CNC apparatus using a servo system speed control apparatus of the present invention.

FIG. 3 is a schematic block diagram showing a CNC apparatus using a speed control apparatus of a servo system of the present invention.

As shown in FIG. 3, the CNC apparatus comprises a microprocessor 4, a RAM 5 connected to the microprocessor 4 through a bus, a ROM 6, a bubble memory 7, a CRT 8, a keyboard 9, and an axis control unit 10.

A command from the axis control unit 10 is supplied to a servo amplifier 11, and a servo motor 12 is controlled in accordance with an output signal of the servo amplifier 11. A position transducer 13, for example, a pulse encoder and the like, is provided at the servo motor 12, and an output signal of the position transducer 13 is fed back to the axis control unit 10.

Figure 4:
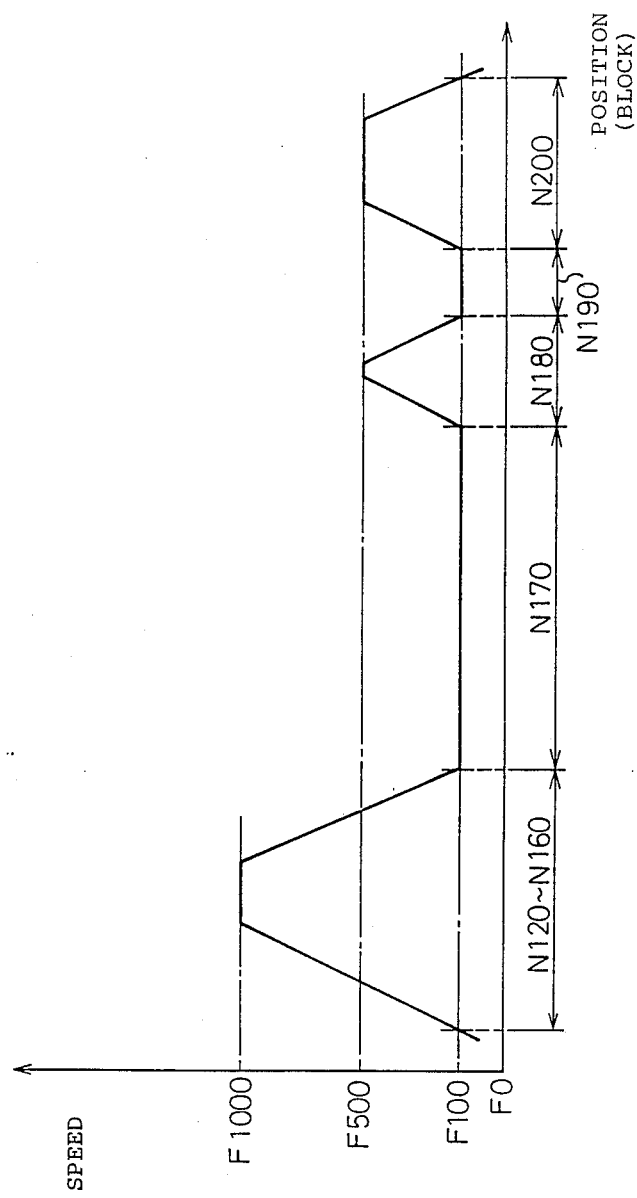
FIG. 4 is a diagram showing one example of a speed change of a servo system controlled by a servo system speed control apparatus of the present invention.

FIG. 1 is a diagram showing an example of the control command of the CNC apparatus, and FIG. 4 is a diagram showing one example of a speed change of a servo system controlled by a servo system speed control apparatus of the present invention.

As shown in FIGS. 1 and 4, when a speed of F 1000 between blocks N 120 and N 160 is changed to a speed of F 100 at a block N 170, in the present embodiment, the designated speeds of a plurality of blocks are previously read, and decelerating start positions are calculated to maintain a servo system speed that is lower than the designated speeds of the blocks at the starting positions of the blocks read beforehand.

Therefore, deceleration begins from a position before the block N 170, and the servo system speed is decelerated to a speed of F 100, which is a designated speed of the block N 170, at the start position of block N 170. Similarly, when a speed of F 500 in a block N 180 is changed to a speed of F 100 at a block N 190, the deceleration is begun from a position preceding block N 190, and the servo system speed is decelerated to a speed of F 100, which is a designated speed of the block N 190, at the start position of the block N 190.

Note, when an acceleration is performed, for example, when a speed of F 100 in the block N 170 is changed to a speed of F 500 at the block N 180, the acceleration of the servo system is performed from a start position of block N 180. Namely, for an acceleration, the servo system speed can be accelerated to the designated speed of each block from the start position of each block. In this case, although the actual speed of the servo system is slower than the designated speed of the block, and thus the operation time is longer, there is absolutely no negative influence on the processing accuracy. Similarly, when a speed of F 100 in a block N 190 is changed to a speed of F 500 at a block N 200, acceleration of the servo system is begun from the start position of the block N 200.

Figure 5:
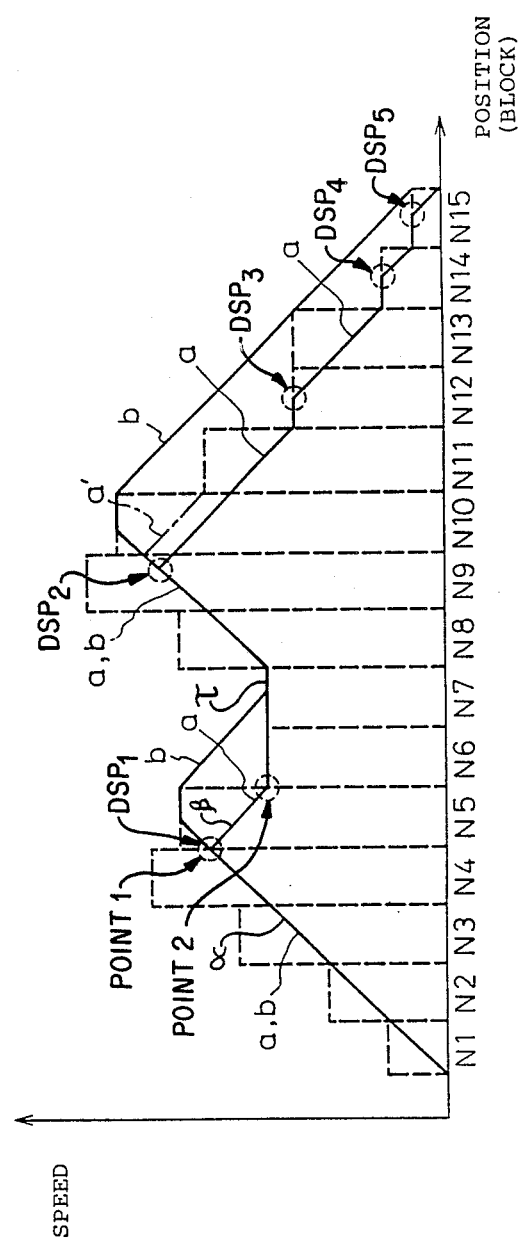
FIG. 5 is a diagram showing a comparison of a speed change of a servo system controlled by the servo system speed control apparatuses of the present invention and of a conventional type; and, FIG. 6 is a flow chart showing an example of a control operation based on the present invention.

FIG. 5 shows the designated speeds from a block N 1 to block N 15, and speeds of the servo system controlled by both a conventional and the present servo system speed control apparatuses. Curve a denotes a servo system speed controlled by the present servo system speed control apparatus and Curve b denotes the servo system speed controlled by a conventional servo system speed control apparatus.

As shown in FIG. 5, from block N 1 to block N 4, where designated speeds are gradually increased, the Curve a and the Curve b indicate that acceleration of the servo system speed is the same as the designated speeds of the blocks.

At the start position of a block N 5, Curve a, indicating the speed of the servo system using the servo system speed control apparatus of the present invention, shows a decrease in the servo system speed to the designated speed of a block N 6 at the start position of the block N 6, and Curve b, indicating the speed of the servo system using a conventional servo system speed control apparatus, shows that the servo system speed continues to accelerate until the servo system speed reaches the designated speed of block N 5, and that the deceleration of the servo system speed is begun from the start position of block N 6, where the designated speed of block 6 is first recognized. The servo system speed controlled by the conventional servo system speed control apparatus is decelerated to the designated speed of the block N 6 (designated speed of the block N 7) over the latter half of block N 7. Note, the rising angle of the acceleration curve and the falling angle of the deceleration curve are determined by the characteristics of each servo system.

In block N 8 and block N 9, at which the designated speeds thereof are gradually increased, Curve a and the Curve b indicate that the servo system speeds are accelerated, Curve a shows that the deceleration begins just before the end position of block N 9, and that the servo system speed equals the designated speed of block N 12 at the start position of block N 12.

Note, as shown in Curve a', if deceleration is begun from the start position of block N 10 (which is the end position of block N 9) by considering only the designated speed of block N 11, the servo system speed will be equal to the designated speed of the block N 11 at the start position of block N 11, but the servo system speed cannot be lowered to the designated speed of the next block N 12 at the start position of block N 12. In this case, the servo system speed must be kept below the designated speeds of blocks at start positions of all of the blocks read beforehand.

Note, the number of previously read blocks, for example, 40 blocks or 60 blocks, is determined by the servo system using the adjustable speed control apparatus.

As described above, in a servo system using the present speed servo system speed control apparatus, the servo system speed is kept below the designated speed of all of the blocks.

Figure 6:
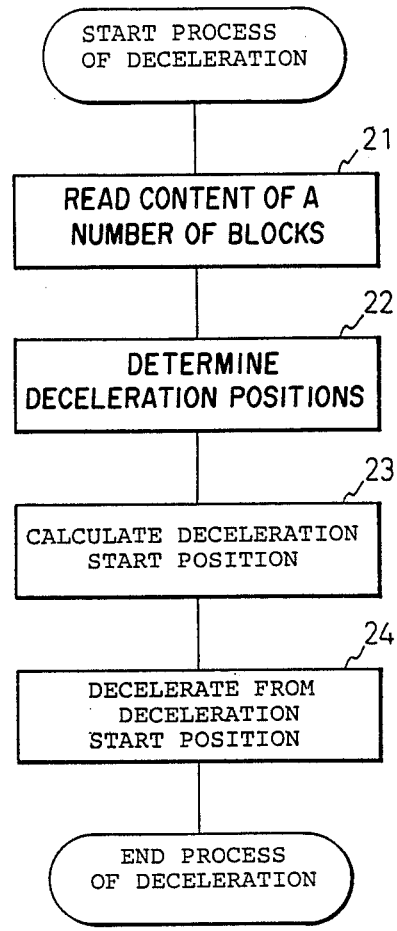

FIG. 6 is a flow chart showing an example of a control operation based on the present invention.

When the deceleration process is started, first, in step 21, several blocks are pre-read. The number of blocks read beforehand, for example, 40 blocks or 60 blocks, is determined by the servo system by using the servo system speed control apparatus. Next, at step 22, the deceleration positions of the blocks read beforehand are determined, and the process then moves to step 23.

At step 23, a deceleration start position is calculated. In this calculation of the deceleration start position, the servo system speed is kept below the designated speed of the blocks at the start position thereof. As shown in FIG. 5, curve a represents the speed controlled by the servo system control of the instant invention. In curve a, point 1 represents the deceleration start position (DSP) for a block, while point 2 represents the start position of a block. As further shown in curve a in FIG. 5, $\alpha$ represents an acceleration curve; $\beta$ represents a deceleration curve; and $\tau$ represents the designated speed of a block. As further shown in FIG. 5, curve a includes deceleration start positions DSP1 and DSP2. DSP1 is cross-point between an acceleration curve and a deceleration curve. DSP2 is a cross-point between an acceleration curve and a deceleration curve through start positions of blocks N10, N11. Also, curve a includes deceleration start positions DSP3, DSP4 and DSP5. DSP4 and DSP5 are cross-points between a designated speed of a block and a deceleration curve. DSP3 is a cross-point between a designated speed of block N12 and a deceleration curve through the start position of block N13. Next, at step 24, the deceleration is started from the calculated deceleration start position.

Consequently, the servo system speed control apparatus can maintain a servo system speed that is below the designated speeds of all of the blocks, and thus control the deceleration of the servo system with a high degree of accuracy.

In the above explanation, the servo system speed control apparatus of the present invention is not limited to use only for a CNC apparatus such as a lathe, but also can be used for the servo systems of industrial robots and the like.

While the invention has been particularly shown and described in reference to preferred embodiments thereof, it will be understood by those skilled in the art that changes in form and details may be made therein without departing from the spirit and scope of the invention.

We claim:

1. A servo system speed control apparatus for controlling speed of a servo system by using a computer, said servo system speed control apparatus comprising:
   a block speed pre-read means for reading beforehand a speed value designated for a plurality of blocks;
   a deceleration start position calculating means for calculating; at a start position of said blocks read beforehand, a deceleration start position to maintain said servo system at a speed below said designated speeds for said blocks; and
   a servo system deceleration means for lowering said speed of said servo system from said calculated deceleration start position to thereby control deceleration of said servo system with a high degree of accuracy.

2. An apparatus according to claim 1, wherein said deceleration start position calculating means is for calculating said deceleration start position at a cross point between an acceleration curve of said servo system and a deceleration curve of said servo system.

3. An apparatus according to claim 1, wherein said deceleration start position calculating means is for calculating said deceleration start position at a cross point between an acceleration curve of said servo system and a deceleration curve of said servo system passing through a start position of each of said blocks.

4. An apparatus according to claim 1, wherein said deceleration start position calculating means is for calculating said deceleration start position at a cross point between a designated speed value of one of said blocks and a deceleration curve of said servo system.

5. An apparatus according to claim 1, wherein said deceleration start position calculating means is for calculating said deceleration start position at a cross point between a designated speed value of one of said locks and a deceleration curve of said servo system passing through a start position of each of said blocks.

* * * * *